United States Patent [19]

Cray et al.

[11] Patent Number: 5,824,814
[45] Date of Patent: Oct. 20, 1998

[54] PROCESS FOR STABILISING SILOXANE POLYMERS

[75] Inventors: Stephen E. Cray, Vale of Glamorgan; Martin J. Evans, Mid Glamorgan, both of United Kingdom

[73] Assignee: Dow Corning Ltd, Barry, United Kingdom

[21] Appl. No.: 17,589

[22] Filed: Feb. 3, 1998

[30] Foreign Application Priority Data

Feb. 4, 1997 [GB] United Kingdom .................... 9702234

[51] Int. Cl.⁶ ....................................................... C07F 7/08
[52] U.S. Cl. ................................................................ 556/401
[58] Field of Search ............................................. 556/401

[56] References Cited

U.S. PATENT DOCUMENTS

4,973,620 11/1990 Ona et al. ........................... 556/401 X
5,264,601 11/1993 Shinohara et al. ...................... 556/401

FOREIGN PATENT DOCUMENTS

0 342 830 A2 11/1989 European Pat. Off. .

*Primary Examiner*—Paul F. Shaver
*Attorney, Agent, or Firm*—Arne R. Jarnholm

[57] ABSTRACT

A method for preparing a viscosity stable amido functional polysiloxane having a group $=NCO(CHR)_nOH$ connected with a silicon atom of a siloxane unit of the polysiloxane comprises;

i) preparing a viscosity stable intermediate amino functional polysiloxane having one or more siloxane units according to the general formula $R^2_{q'}(HR^4N\ R'')_r SiO_{(4-(q'+r'))/2}$, any remaining units of the intermediate being of the general formula $R^2_q SiO_{(4-q)/2}$, by condensation polymerisation;

ii) adding an alcohol or substituted alcohol to the intermediate or to organo-silicon compounds used to produce the intermediate by condensation polymerisation, the alcohol or substituted alcohol being of the general formula $R^1OH$, wherein $R^1$ is a substituted or unsubstituted alkyl group of from 4 to 30 carbon atoms, and;

iii) reacting the viscosity stable intermediate polysiloxane resulting from ii) with a lactone of the general formula

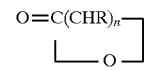

wherein R and n are as defined above. The amido functional polysiloxanes are useful as treating agents for fibrous materials, for example textile fabrics.

10 Claims, No Drawings

PROCESS FOR STABILISING SILOXANE POLYMERS

The present invention relates to a method for stabilising siloxane polymers, in particular amido-functional siloxane polymers.

It is known to treat fibrous materials with polysiloxanes to impart desirable properties thereto. For example, textile fabrics may be treated with polysiloxanes to impart water repellency, lubricity and crease resistance. Proposals have been made to treat textile fabrics with aqueous emulsions or dispersions which comprise amido functional polysiloxanes to impart high levels of softness and have less tendency to give a yellow colour to the treated fabric than similar treatment with amino substituted polysiloxanes.

It is known to prepare amido functional polysiloxanes by reaction between a lactone and a silicone compound having an amino substituent, see EP-A-0342830. The silicone compound having an amino substituent for this reaction is commonly prepared from precursors comprising one or more hydroxy polysiloxanes and hydrolysable aminosilanes by condensation polymerisation, often in the presence of a condensation catalyst. Siloxane polymers which are made by condensation polymerisation have a tendency to continue reacting at the end of the manufacturing process, even when the catalyst has been deactivated or removed. This is true for many different siloxane polymers prepared by condensation polymerisation, is particularly true for those having reactive substituents, and is most clearly observed for silicone materials having amine or amido functional substituents. This continued reaction usually results in an increase of viscosity with time, which can result in the final amido functional polysiloxane product being difficult to process, handle and use for textile fabric treatment.

We have now found that by employing certain alcohols or substituted alcohols, together referred to as stabilising alcohols in this specification, in the preparation of an intermediate amino functional polysiloxane, the viscosity of an amido functional polysiloxane prepared from the amino functional polysiloxane can be stabilised.

According to the present invention there is provided a method of preparing a viscosity stable amido functional polysiloxane having a group $=NCO(CHR)_nOH$ connected with a silicon atom of a siloxane unit of the polysiloxane wherein R represents a hydrogen atom or an alkyl group and n has a value in the range 2 to 7, which method comprises i) preparing a viscosity stable intermediate amino functional polysiloxane having one or more siloxane units according to the general formula $R^2_{q'}(HR^4N\ R'')_{r'}SiO_{(4-(q'+r'))/2}$, any remaining units of the intermediate being of the general formula $R^2_q SiO_{(4-q)/2}$, by condensation polymerisation wherein $R^2$ is a hydroxyl group, a monovalent hydrocarbon group having up to 8 carbon atoms R', a group OR' or a group COR', $R^4$ represents a hydrogen atom, an alkyl group having 1 to 20 carbon atoms, an alkenyl group or an aryl group, R'' represents a divalent hydrocarbon group having 1 to 20 carbon atoms which may have nitrogen, oxygen or sulphur present in the carbon chain, q has the value 0, 1, 2 or 3, q' has the value 0, 1, or 2, and r' has the value 1 or 2;

ii) adding an alcohol or substituted alcohol to the intermediate or to organo-silicon compounds used to produce the intermediate by condensation polymerisation, the alcohol or substituted alcohol being of the general formula $R^1OH$, wherein $R^1$ is a substituted or unsubstituted alkyl group of from 4 to 30 carbon atoms, and;

iii) reacting the viscosity stable intermediate polysiloxane resulting from ii) with a lactone of the general formula

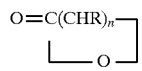

wherein R and n are as defined above.

Steps i) and ii) above may be performed simultaneously or step ii) may be performed subsequently to step i). Preferably, steps i) and ii) are performed simultaneously.

Preferably the viscosity of the amido functional viscosity stable polysiloxane at 25° C. is from 50 to 8,000 mm²/s.

The method according to the present invention may be performed by mixing the intermediate amino functional polysiloxane made by condensation polymerisation with the stabilising alcohol and storing them together; however, more preferably the stabilising alcohol is added to the organosilicon compounds used to form the intermediate by condensation polymerisation prior to or during the polymerisation process. The latter is preferred as the viscosity of the final amido functional polysiloxane is more stable with time than if the stabilising alcohol is merely mixed with the amino functional intermediate after the polymerisation reaction is completed, which stabilisation is, however, still a substantial improvement over polysiloxanes prepared without employing the stabilising alcohol.

The method according to the invention comprises the use of a stabilising alcohol. Suitable alcohols are those of the general formula $R^1OH$, wherein $R^1$ is alkyl or a substituted alkyl group having 4 to 30 carbon atoms. A substituted alkyl group is an alkyl group which has substituted on one of its carbon atoms a functionality which is preferably selected from amino, epoxy or ether functionality. Examples of suitable $R^1$ groups include linear and branched alkyl groups, cycloalkyl groups, aminoalkyl groups, alkoxyalkyl groups or polyoxyalkylene alkyl groups, for example n-butyl, isobutyl, pentyl, hexyl, decyl, dodecyl, tridecyl, stearyl, eicosyl, cyclohexyl, aminoethyl, aminopropyl, methylaminopropyl, aminocyclohexyl, methoxyethyl and alkoxylated polyethyloxy propyl. It is preferred that the $R^1$ group is a linear or branched alkyl group or an aminoalkyl group, more preferably a linear or branched alkyl group having from 6 to 20 carbon atoms, e.g. hexyl, most preferably having 8 to 18 carbon atoms, e.g. 2-ethylhexyl, isotridecyl or isostearyl. Particularly useful stabilising alcohols are n-hexanol, n-decanol, 2-ethyl hexanol, isotridecanol, isostearyl alcohol and hexanolamine. The reaction of method step i) is preferably carried out at elevated temperatures, at least sufficient to evaporate the by-products of the condensation reaction, i.e. water and/or lower alcohols, e.g. 50° to 120° C., more preferably 60° to 100° C. The removal may be aided by the use of reduced pressure to strip off the more volatile condensation by-products, thus encouraging the reaction of the stabilising alcohols into the siloxane polymers.

The amount of alcohol used in the process of the invention may vary from 0.1 to 15% by weight based on the amount of intermediate amino functional polysiloxane formed by condensation polymerisation. In the process where the stabilising alcohol is mixed with the intermediate amino functional polysiloxane formed by condensation polymerisation it is preferred that the amount of stabilising alcohol is from 0.1 to 8% based on the weight of the intermediate amino functional polysiloxane, whereas in the process where the stabilising alcohol is mixed with the precursors prior to the condensation reaction that the amount is from 2 to 12%. Higher amounts are possible but do not bring any additional benefits. It is the aim to add an amount of stabilising alcohol which will give approximately a 1/1 molar ratio, or a small excess thereof, of alcoholic hydroxyl groups to the number of hydrolysable groups which would be present in the intermediate polysiloxane obtained by condensation polymerisation were the stabilising alcohol not present. It follows that a higher weight level of stabilising alcohol is required when alcohols with a higher molecular weight are used to give the same number of alcoholic hydroxyl groups, for example when the alcohol is isotridecanol the amount added is preferably from 5.0 to 7.0%.

The intermediate amino functional polysiloxane may be prepared from precursors comprising one or more hydroxy polysiloxanes and hydrolysable aminosilanes, alkoxy silanes being generally preferred. Suitable hydroxy polysiloxanes include those having organo groups which are at least predominantly alkyl groups having up to eight carbon atoms. When preparing the intermediate amino functional polysiloxane a silicone material capable of providing a desired degree of chain branching may be employed among the precursors for the intermediate amino functional polysiloxane. Suitable materials are silanes $R^3_3Si$ and $A_4Si$ wherein $R^3$ represents a monovalent hydrocarbon group having up to 8 carbon atoms and A represents a hydroxyl group or other hydrolysable group, for example an alkoxy (e.g. methoxy) group. The intermediate amino functional polysiloxane may be condensed and or equilibrated with selected organosilicon compounds of appropriate structure and molecular weight. Desirably, the intermediate amino functional polysiloxane has a major proportion of siloxane units of the general formula $R^2_qSiO_{(4-q)/2}$ and a minor proportion of siloxane units of the general formula $R^2_{q'}(HR^4N\ R")_{r'}SiO_{(4-(q'+r'))/2}$ wherein $R^2$, R", $R^4$, q' and r' are as aforesaid. Preferred materials are those wherein R" represents $R'''(NR^5R''')_s$, wherein R''' represents a divalent hydrocarbon group, $R^5$ is a group $R^4$ and s has a value in the range 0 to 4, more preferably 1 or 2. Examples of suitable groups R''' include —(CH$_2$)$_2$—, —(CH$_2$)$_3$—, —(CH$_2$)$_4$— and —CH$_2$CH(CH$_3$)CH$_2$—. Operative amino containing substituents $R"NR^4H$ include —(CH$_2$)$_3$NH$_2$, —(CH$_2$)$_3$NHCH$_2$CH$_2$NH$_2$, —CH$_2$CH(CH$_3$)CH$_2$NHCH$_2$CH$_2$NH$_2$, and —(CH$_2$)$_3$—NHCH$_2$CH$_2$NHCH$_2$CH$_2$NH$_2$. Preferred intermediate amino functional polysiloxanes are those in which the $R^2$ groups are lower alkyl, e.g. methyl groups, or phenyl groups, and which have two or more amino siloxane units per molecule.

Most preferred are those in which at least 80% of the groups $R_2$ are methyl groups.

The lactones used in the present invention are represented by the formula:

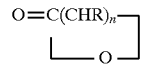

in which R represents a hydrogen atom or an alkyl group, for example having up to 7 carbon atoms such as may be present when the lactone has been derived from a hydroxy acid, and n has a value in the range of from 2 to 7. Preferred lactones are those in which each R represents a hydrogen atom and n has the value 3, 4, 5 or 6, for example butyrolactone and epsilon caprolactone in which every R is a hydrogen atom. The most preferred lactone is butyrolactone.

Reaction between the lactone and the intermediate amino functional polysiloxane to form the final amide functional polysiloxane may be carried out under a variety of conditions, for example by heating the reactants together, optionally in aqueous emulsion or in solution, under reflux in, for example, methyl ethyl ketone, toluene or ethanol, or preferably by vigorously blending the lactone and the intermediate amino functional polysiloxane at ambient temperature. The proportions of the reactants employed may be chosen so that the desired proportion of the amino groups of the intermediate polysiloxane are converted to amido groups. For example, one may ensure that from 20 to 80% of the primary amino groups are modified by reaction with the lactone.

The viscosity stable amido functional polysiloxane prepared by the method of the present invention are polysiloxanes having a group $=NCO(CHR)_nOH$, which preferably forms part of a substituent $—R"NXR^6$ connected with a silicon atom of a siloxane unit of the polysiloxane through divalent linkage R" defined above, wherein X represents a group $—CO(CHR)_nOH$ and $R^6$ represents a hydrogen atom, a group X, an alkyl group having 1 to 20 carbon atoms, an alkenyl group or an aryl group. Preferably R represents a hydrogen atom and n has the value 3, 4, 5 or 6. Preferred materials are those wherein R" represents a divalent hydrocarbon group or a group R''' $(NR'R''')_s$ wherein R''' represents a divalent hydrocarbon group, and s has a value in the range 0 to 4, more preferably 1 or 2. Preferred groups $R"NXR^6$ are according to the general formula

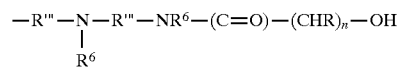

in which R''' is selected from the groups —(CH$_2$)$_2$—, —(CH$_2$)$_3$—, —(CH$_2$)$_4$— and —CH$_2$CH(CH$_3$)CH$_2$—, and $R^6$ represents a hydrogen atom. Preferred viscosity stable amido functional polysiloxanes prepared according to the present invention include both siloxane units which have groups $R"NR^4H$ and siloxane units which have no groups $R"NR^4H$, as defined above, and may also have 90% or more, suitably more than 95% and preferably 97 to 99% of siloxane units according to the general formula $R^2_qSiO_{(4-q)/2}$ as defined above. If desired, a polysiloxane according to the present invention may also comprise one or more siloxane units having other substituent groups, for example, oxyalkylene glycol groups. $R^2$ is preferably an alkyl group, most preferably methyl. Preferred polysiloxanes prepared according to the present invention are at least substantially linear materials, the most preferred being according to the general formula:

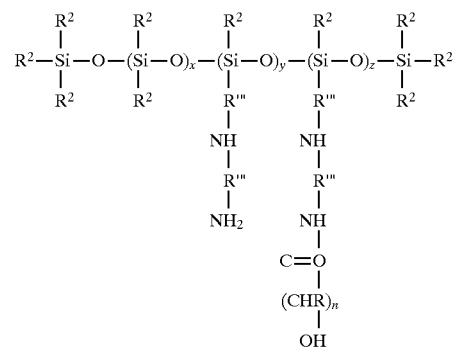

in which not less than 80% of the groups $R^2$ are methyl groups and wherein each $R^2$ connected to a terminal silicon atom may be independently selected from a methyl group, a hydroxyl or other hydrosylable group and a substituted or unsubstituted alkyl group of from 4 to 30 carbon atoms, x has a value from 20 to 1500, y has an average value from 0 to 50 and z has an average value from 1 to 50. More preferably, the ratio of y:z lies in the range 1:4 to 4:1 and the ratio z:x is less than 5:100.

The viscosity stable amido functional polysiloxanes of the method of the present invention are siloxane polymers which have lower and more stable viscosities than corresponding polymers which are made from the same starting materials without any stabilising alcohol. The viscosity may remain substantially constant for an indefinite time, but is more likely to continue to increase but at a much slower rate compared to if no stabilising alcohol were employed, thus providing an increase in the shelf life of the product.

The polysiloxane obtained by the method of the present invention may be provided as a homogeneous liquid composition, or as an emulsion. The product of the method of the present invention may comprise either pure polysiloxane or a mixture thereof with unreacted components from the reaction mixture and/or by-products. Preferably, the reaction product substantially consists of pure polysiloxane, the stabilising alcohol having been largely used up in the process.

Emulsions of the viscosity stable amido functional polysiloxane may be provided according to standard emulsification techniques and can be macroemulsions or microemulsions.

Compositions comprising the product of the method of the present invention are useful in a number of applications, for example as coatings or finishes on various substrates. They may be formulated as solutions or emulsions and may be formulated so as to cure on a substrate to which they are applied. For example, they may be employed as a blend with other ingredients, for example polydimethylsiloxanes, or with materials commonly employed in coatings or finishes. The amido functional polysiloxanes are efficacious in the treatment of fibres and particularly natural fibres, for example new or freshly laundered textile fabrics consisting of or incorporating fibres of cotton, which may be blended with other fibres for example polyester, to provide a finish which confers a good handle or feeling of softness and less yellow colouring to the treated fabric than similar treatments with the corresponding polysiloxane having solely amino organofunctionality. Those polysiloxanes prepared according to the method of the present invention having both amido substituted siloxane and primary amino substituted siloxane units may be used for the treatment of fibres and particularly natural fibres, for example textile fabrics incorporating fibres of cotton, to provide a finish which shows a desirable blend of softness, whiteness and durability. The preparation of amido functional polysiloxanes according to the method of the present invention from the appropriate lactone and amino functional polysiloxane is particularly beneficial as no undesirable by-product is released during the reaction.

Embodiments of the present invention will be now be described in detail by way of example.

COMPARATIVE EXAMPLE 11.6 g of octamethyltrisiloxane endblocker, 1420 g of dimethyl cyclic siloxane, 68.3 g of N-(3-(dimethoxymethylsilyl)-2-methylpropyl)-1,2-ethanediamine and 7.5 g of potassium hydroxide containing catalyst were added to a flask and heated to 140° C. with stirring under nitrogen.

After five hours the product was allowed to cool before 1.23 g glacial acetic acid was added to neutralise the catalyst. The product was heated at 60° C. for one hour and then cooled and filtered to produce an amino functional polysiloxane having the approximate general formula $Me_3SiO(Me_2SiO)_{98}(MeQSiO)_2SiMe_3$, wherein Q represents the group $CH_2CHMeCH_2NH(CH_2)_2NH_2$, and having a viscosity of 958 mPa.s.

A number of amino functional polysiloxanes having different viscosities were made in this way.

Each amino functional polysiloxane was vigorously blended at ambient temperature with γ-butyrolactone in an amount depending upon the amount and nitrogen content of the amino functional polysiloxane used, calculated according to the formula:

Wt. lactone=Wt. amine polymer×% N/100×1/28×86 wherein N is said nitrogen content.

The viscosity of each product amido functional polysiloxane was measured immediately and the results are given below in Table 1, in which each amido functional polysiloxane viscosity value may be compared with that of the amino functional polysiloxane from which it is derived:

TABLE 1

| Viscosity (mPa · s) | |
|---|---|
| Amine polymer | Amide polymer |
| 958 | 15450 |
| 1162 | 22300 |
| 1318 | 26700 |
| 1398 | 27200 |
| 1778 | 39950 |
| 2084 | 42100 |
| 2472 | 59300 |

EXAMPLE

Polysiloxane of the approximate general formula HO—$(Me_2SiO)_{40}$—OH, ethylenediaminosiloxane, isotridecanol and barium hydroxide/sodium orthophosphate dual catalyst were added to a reaction vessel and heated at 85° C. for 2 hours under reflux conditions. The vessel pressure was then gradually reduced to 200 mBar and the reaction continued for 4.5 hours, with aliquots taken at regular intervals to monitor the progress of the reaction. At the end of the reaction the vacuum was released and the temperature allowed to fall to ambient.

The resulting polymer was vigorously blended at ambient temperature with γ-butyrolactone in an amount calculated according to the formula of the Comparative Example above to give an amidofunctional polysiloxane product.

A number of different amido functional polysiloxanes were made according to this method by employing differing amounts of isotridecanol and differing amounts of γ-butyrolactone as shown in Table 2 below.

The viscosity of each product amido functional polysiloxane was measured after one week and eight weeks and the results are given in Table 2 below, together with the viscosities of the intermediate amino functional polysiloxane from which they were produced:

TABLE 2

| | Viscosity (mPa · s) | | |
|---|---|---|---|
| System | Amino polymer | 1 week | 8 weeks |
| 6.75% isotridecanol | 563 | Low 2576 | 3662 |
| | | Med 3460 | 5739 |
| | | High 3092 | 5603 |
| 6.75% isotridecanol | 563 | Low 1794 | 2396 |
| | | Med 2369 | 3588 |
| | | High 2393 | 3011 |

TABLE 2-continued

| System | Viscosity (mPa · s) | | |
|---|---|---|---|
| | Amino polymer | 1 week | 8 weeks |
| 6.25% isotridecanol | 573 | Low 2664 | 4891 |
| | | Med 3608 | 7287 |
| | | High 3780 | 7778 |

N.B. % isotridecanol is calculated by weight of amino polymer
Low=calculated wt. of lactone required minus 25%
Med=calculated wt of lactone required
High=calculated wt of lactone required plus 25%

A comparison of the results in Tables 1 and 2 clearly shows that without the inclusion of isotridecanol as stabilising alcohol in the reaction mixture for preparing the amino functional polysiloxane the viscosity of the resulting amido functional polysiloxane is much higher compared to when isotridecanol is included. Moreover, the results in Table 2 show that not only are the viscosities of the latter products much lower than the former but also that they remain so after a two week period.

That which is claimed is:

1. A method for preparing a viscosity stable amido functional polysiloxane, which amido functional polysiloxane has a group =NCO(CHR)$_n$OH connected with a silicon atom of a siloxane unit of the polysiloxane wherein R is selected from the group consisting of a hydrogen atom and an alkyl group, and n has a value in the range 2 to 7, which method comprises;

i) preparing a viscosity stable intermediate amino functional polysiloxane having at least one siloxane units according to the general formula R$^2_{q'}$(HR$^4$N R")$_{r'}$SiO$_{(4-(q'+r'))/2}$, any remaining units of the intermediate being of the general formula R$^2_q$SiO$_{(4-q)/2}$, by condensation polymerisation, wherein R$^2$ is selected from the group consisting of a hydroxyl group, a monovalent hydrocarbon group having up to 8 carbon atoms R', a group OR' and a group COR', R$^4$ is selected from the group consisting of a hydrogen atom, an alkyl group having 1 to 20 carbon atoms, an alkenyl group and an aryl group, R" represents a divalent hydrocarbon group having 1 to 20 carbon atoms which may have a heteroatom selected from nitrogen, oxygen and sulphur present in the carbon chain, q has the value 0, 1, 2 or 3, q' has the value 0, 1, or 2, and r' has the value 1 or 2;

ii) adding an alcohol of the general formula R$^1$OH, wherein R$^1$ is selected from the group consisting of substituted and unsubstituted alkyl groups of from 4 to 30 carbon atoms to a compound selected from the group consisting of (a) the intermediate of step i) above and (b) to organo-silicon compounds used to produce said intermediate by condensation polymerisation, and;

iii) reacting the viscosity stable intermediate polysiloxane resulting from step ii) above with a lactone of the general formula

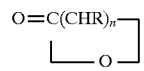

wherein R and n are as defined above.

2. A method according to claim 1 wherein R$^1$ is selected from the group consisting of linear and branched alkyl groups, cycloalkyl groups, aminoalkyl groups, alkoxyalkyl groups and polyoxyalkylene alkyl groups.

3. A method according to claim 2 wherein R$^1$ is selected from the group consisting of n-butyl, iso-butyl, pentyl, hexyl, decyl, dodecyl, iso-tridecyl, stearyl, eicosyl, cyclohexyl, aminoethyl, aminopropyl, methylaminopropyl, aminocyclohexyl, methoxyethyl and alkoxylated polyethyloxy propyl groups.

4. A method according to claim 2 wherein R$^1$OH is selected from the group consisting of n-hexanol, n-decanol, 2-ethyl hexanol, iso-tridecanol, isostearyl alcohol and hexanolamine.

5. A method according to claim 1 wherein the alcohol is present in an amount of from 5 to 7% by weight based on the amount of intermediate amino functional polysiloxane formed by condensation reaction.

6. A method according to claim 1 wherein the group =NCO(CHR)$_n$OH of the viscosity stable amido functional polysiloxane is part of a substituent —R"NXR$^6$ in which R" represents a divalent hydrocarbon group which may have a heteroatom selected from the group consisting of nitrogen, oxygen and sulphur atoms present in the carbon chain, R$^6$ is selected from the group consisting of a hydrogen atom, a group X, an alkyl group having 1 to 20 carbon atoms, an alkenyl group and an aryl group, and X represents a group —CO(CHR)$_n$OH wherein n has a value in the range 2 to 7.

7. A method according to claim 6 wherein the group R"NXR$^6$ is according to the formula R"NR$^6$R'"NXR$^6$ wherein each R$^6$ is a hydrogen atom, each R" is selected from the group consisting of a group —(CH$_2$)$_3$—, —(CH$_2$)$_4$—, and —CH$_2$CH(CH$_3$)CH$_2$— and each R'" is a group —(CH$_2$)$_2$—.

8. A method according to claim 1 wherein the viscosity stable amido functional polysiloxane is of the general formula

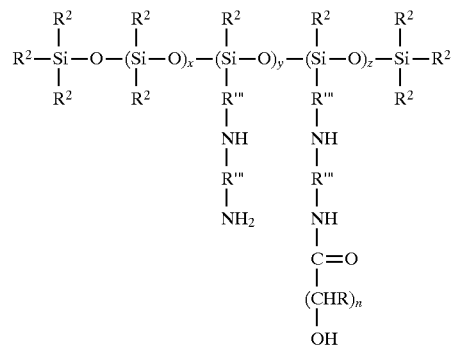

in which not less than 80% of the groups R$^2$ are methyl groups and wherein each R$^2$ connected to a terminal silicon atom may be independently selected from the group consisting of a methyl group, a hydroxyl group, a hydrosylable group other than hydroxyl, a substituted alkyl group of from 4 to 30 carbon atoms and an unsubstituted alkyl group of from 4 to 30 carbon atoms, x has an average value from 20 to 1500, y has an average value from 0 to 50 and z has an average value from 1 to 50.

9. A method according to claim 8 wherein y=0 and the ratio z:x is less than 5:100.

10. A method according to claim 8 wherein the ratio of y:z lies in the range 1:4 to 4:1.

* * * * *